May 15, 1923.

W. W. LYONS ET AL

CUTTING TOOL

Filed Nov. 21, 1921

1,455,297

INVENTOR
William W. Lyons
George E. McBerg
BY
ATTORNEY

Patented May 15, 1923.

1,455,297

UNITED STATES PATENT OFFICE.

WILLIAM W. LYONS AND GEORGE E. McELROY, OF NEWARK, NEW JERSEY, ASSIGNORS TO HELLER TOOL COMPANY, OF NEWARK, NEW JERSEY, A CORPORATION OF NEW JERSEY.

CUTTING TOOL.

Application filed November 21, 1921. Serial No. 516,562.

*To all whom it may concern:*

Be it known that we, WILLIAM W. LYONS and GEORGE E. McELROY, citizens of the United States, residing at Newark, in the county of Essex and State of New Jersey, have invented new and useful Improvements in Cutting Tools, of which the following is a specification.

This invention relates to cutting tools of the geared handle type and consists of improvements in the construction and arrangement of parts particularly applicable to the construction of nippers or shears for heavy work, such as the cutting of steel bolts and bars, and is designed to possess important advantages over this type of tool as heretofore made. A particular object of the present invention is to provide a device of this character which will be strong and durable in construction, efficient in its action, of few and simple parts which may be quickly and accurately assembled and of a design wherein the cutting jaw members are similar and interchangeable to facilitate the replacing of parts.

As is readily appreciated, in devices of this character, replacing of the cutting jaws is often required as they obviously are subjected to the most severe wear and strain. In nippers and similar tools as heretofore made employing the geared operating levers, the arrangement of the gearing has been such as to impose conditions requiring dissimilarity in the cutting jaws, particularly with regard to the gear teeth thereon. As tools of this character are desirably balanced and symmetrical in construction, this dissimilarity in the jaws has heretofore required that for replacement the entire tool or part be returned to the manufacturer for the reason that the jaws cannot be readily identified, such as by "rights and lefts." In the present improved design this important commercial objection is remedied by an improved arrangement which allows of the jaws being of identical construction and in consequence interchangeable so that these parts which are most liable to breakage and damage may more readily be replaced. A further important feature of our present invention consists in a structure giving ready access to the gearing so as to permit of the easy removal of foreign particles which may interfere with the proper operation.

The described and other important features and advantages of the present invention will be more fully understood by reference to the accompanying drawings wherein like reference characters of the description are applied to the corresponding parts in the several views.

Figure 1:
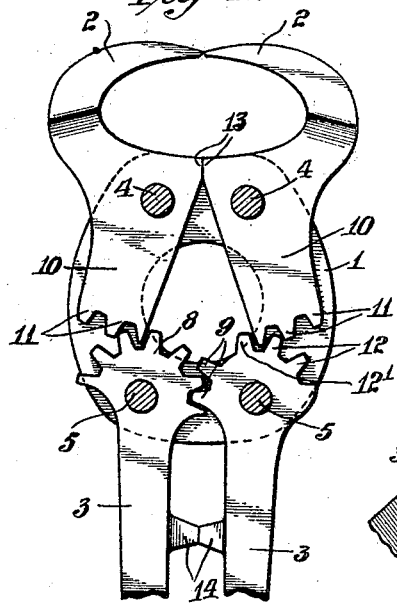
Figure 1 is a view in side elevation illustrating a cutting tool of the nipper class embodying the features of the present invention.

The improved cutting tool as illustrated, is made up of a casing or bearing frame composed of oppositely positioned bearing plates or rings 1, 1 between which are pivoted the opposed coacting cutting jaws 2, 2 and also the coacting parallel operating levers or handles 3, 3 which constitute the principal parts of the tool. The jaw members 2, 2 are pivotally supported upon the bearing studs 4, 4, and the operating levers 3, 3 are similarly pivoted upon bearing studs 5, 5, these studs as illustrated being oppositely positioned in symmetrical arrangement to connect the supporting rings and therewith to form a rigid bearing frame for the moving parts. The bearing studs 5, 5, as shown, at one end have slotted heads 6, 6 and at the opposite ends are threaded for engagement with the ring frame member at one side.

The operating levers at their forward or fulcrumed ends are provided with gear segments 8 and 9 the teeth of which are positioned and arranged for intermeshing engagement whereby the levers are connected to be movable in unison. The cutting jaw members 2 have integrally formed therewith the lever extensions or arms 10, 10 formed at their rearward edges with gear teeth or segments 11, 11 arranged to afford gearing connection with the operating levers by which they are moved into open and closed position upon manipulation of the levers.

In tools of this character having gearing engagement between the operating levers it has heretofore been customary in the manufacture to provide that the gearing segments of the cutting jaws engage with a portion of the gear segments providing the gearing between the operating levers or a continuation of the interengaging operating lever gears, the arrangement being such that the teeth of each of the operating gear levers are arranged in continuation and in equally spaced relation. In this arrangement the positioning of the gear teeth for properly meshing requires that the cutting of the teeth upon the respective levers shall be such as to position teeth of one lever corresponding to the space between the teeth of the opposite lever and likewise that the cutting of the teeth of the jaw segments should be correspondingly dissimilar.

An important feature of the present improved design has for its object to permit of the jaws and the gear segments thereof being identical, with the teeth thereon similarly spaced and positioned, to the end that the jaws may be interchangeable. The specific provision made therefor and as here illustrated, consists in providing the gear teeth upon one of the operating levers in special spaced relation virtually to form an inner segment 9 and an outer segment 12. The teeth of the inner gear segment 9 are suitably spaced to properly mesh with the teeth of the gear segment 8 of the coacting lever while the teeth of the outer segment 12, though conforming in spacing and contour, are positioned on the lever to correspond to the positioning of the teeth of the gear segment 8 on the opposite lever. The arrangement thus provides for one lever having its gear teeth equally spaced and in continuation as a single gear segment and with the coacting lever having its teeth divided into an inner and outer segment each having correspondingly spaced teeth, but of relatively intermediate position whereby the teeth of the outer segment will correspond in position to the spaces in the continuation or projection of the inner segment. As a result of this improved construction and arrangement the gearing between the levers and jaws is such as to allow of the latter being identical in construction and accordingly fully interchangeable.

Figure 2:
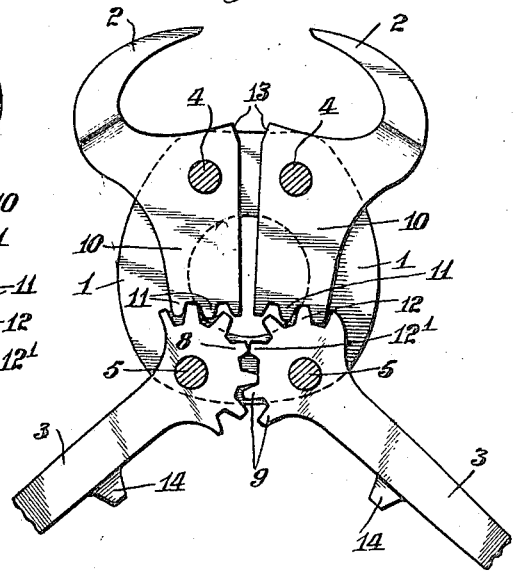
Figure 2 is a similar view showing the parts in open position and with the uppermost bearing plate removed.

A further and advantageous feature of our improved gearing arrangement, as illustrated, is that by reason of the similar positioning of the gear teeth of segments 8 and 12 of the respective levers the innermost tooth 12' of the segmental gear 12 will abut or engage with a tooth of the opposite lever gear segment to provide a stop for the moving parts to determine the extreme open position as illustrated in Fig. 2. Suitable stops are also provided to determine the closed position of the jaws and operating levers, as here shown, consisting of shoulders or abutments 13 formed upon the shanks of the jaws and engaging shoulders 14 integrally projecting from the inner faces of the levers.

In the improved tool illustrated, we have incorporated therewith a further valuable feature which consists in the provision of the openings 16 in the supporting plates which may desirably be circular as shown and oppositely positioned to give ready access to the gearing to facilitate removal of foreign particles that may become lodged in the gear teeth and interfere with proper operation. As will be appreciated in tools of this character small cuttings are particularly liable to drop within the tool requiring their removal.

Figure 3:
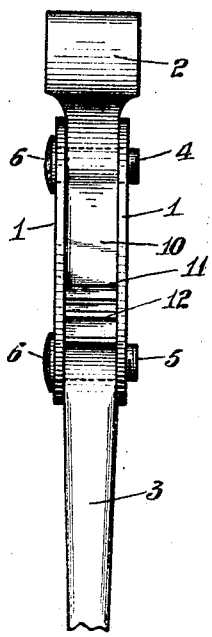
Fig. 3 is a view in elevation taken at right angles to Figures 1 and 2.
Figure 4:
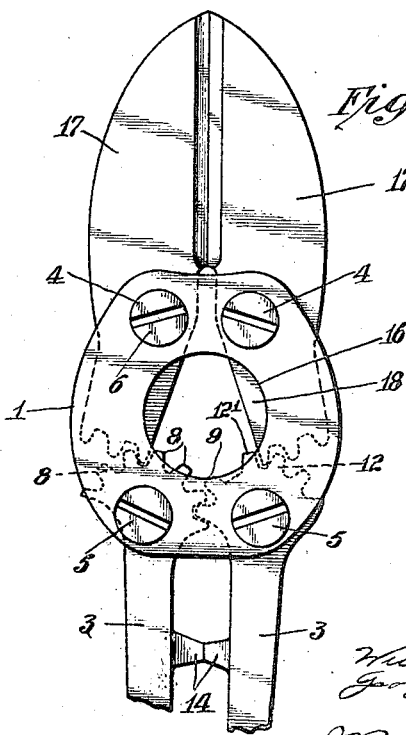
Fig. 4 is a view in side elevation illustrating a modification wherein the features of the present invention are embodied in a shear type of cutting tool.

While we have shown in Figures 1 to 3 the improved features of our invention embodied in a cutting tool of the nipper type and in a desirable manner it will be understood that the several features of the invention are subject to various modification and application without departing from the scope of the invention. As an illustration thereof we have illustrated in Fig. 4 the described features embodied in a shear type of cutter wherein shear blades 17 are substituted for the nipper cutting jaws of the preceding figures; the blade 17 being similarly fulcrumed in the supporting frame and provided with lever extensions 18, corresponding to the lever extensions 10 of the construction first illustrated.

Having described our invention we claim:

1. A lever operated tool of the character described, comprising a pair of fulcrumed operating levers provided with intermeshing gear segments and with gear teeth angularly positioned relatively to correspond, pivotally mounted jaw members provided with lever extensions and having segmental gears thereon in symmetrical arrangement and interengaged with the correspondingly positioned gear teeth of the operating levers whereby the jaw members may be interchangeably positioned, substantially as described.

2. A lever operated tool of the character described comprising a pair of suitably fulcrumed operating levers provided with intermeshing gear teeth and with gear teeth forming outer segments the teeth of which are arranged to correspond in angular position, opposed jaw members suitably fulcrumed and provided with segmental gears meshing with the outer gear segments of the operating levers and formed to be interchangeable, the innermost teeth of the outer gear segments of the operating levers being positioned to provide a stop upon engagement to determine the extreme open position of the parts.

3. A lever operated tool of the character described, comprising supporting frame members oppositely positioned, operating levers pivotally supported within the frame members, said levers being provided with intermeshing gear teeth and with gear teeth angularly positioned relatively to correspond, jaw members pivotally mounted within the frame, said jaw members being provided with lever extensions having gear teeth thereon in similar arrangement and interengaged with the correspondingly positioned gear teeth of the operating levers whereby the jaw members may be interchangeably positioned and said frame members having apertures affording access to the intermeshing gear teeth, substantially as described.

4. A cutting tool of the character described comprising oppositely positioned frame members, opposed jaw members having lever extensions interposed between the frame members and pivotally supported therein symmetrical to the longitudinal axis of the tool, said jaw members being similarly formed with lever extensions provided with correspondingly positioned segmental gears, a pair of operating levers pivotally supported between the frame members symmetrical to the longitudinal axis of the tool and provided with interengaging gear teeth to effect movement of the levers in unison and with outer gear teeth angularly positioned relatively to correspond and to mesh with the jaw lever segments, opposed shoulders upon the operating levers to determine their closed position and the innermost of the correspondingly positioned teeth of the operating levers being adapted to engage to determine the extreme open position of the parts, substantially as described.

5. A cutting tool of the character described comprising oppositely positioned frame members, opposed jaw members having lever extensions interposed between the frame members and pivotally supported therein symmetrical to the longitudinal axis of the tool, said jaw members being similarly formed with lever extensions provided with correspondingly positioned segmental gears, a pair of operating levers pivotally supported between the frame members symmetrical to the longitudinal axis of the tool and provided with interengaging gear teeth to effect movement of the levers in unison and with outer gear teeth angularly positioned relatively to correspond and to mesh with the jaw lever segments, opposed shoulders upon the operating levers to determine their closed position and the innermost of the correspondingly positioned teeth of the operating levers being adapted to engage to determine the extreme open position of the parts, and said frame members being formed with oppositely positioned openings affording access to the gearing, substantially as described.

6. A cutting tool of the character described comprising a pair of pivotally mounted cutting jaw members provided with lever extensions, a pair of pivoted operating levers therefor, said jaw members being provided with similarly formed segmental gears upon the lever extensions thereof and said operating levers being formed and arranged for gearing engagement therewith, one of said levers having the gear teeth thereof in continuous equal spaced relation and the other of said operating levers having its gear teeth forming distinct gear segments, the teeth of which are angularly positioned whereby the teeth of one segment coincide in angular position with what would be the space in the projection of the other segment, substantially as described.

In testimony whereof we have signed our names to this specification.
WILLIAM W. LYONS.
GEORGE E. McELROY.
Witness:
ANNA W. IBACH.